United States Patent [19]

Hale

[11] Patent Number: 4,704,062
[45] Date of Patent: Nov. 3, 1987

[54] SELF POWERED, ROLL-ON AND ROLL-OFF TRAILER

[76] Inventor: Isom H. Hale, 2507 Stratford Dr., Austin, Tex. 78746

[21] Appl. No.: 836,697

[22] Filed: Mar. 6, 1987

[51] Int. Cl.4 ............................................. B60P 1/28
[52] U.S. Cl. ................................ 414/494; 280/423 B; 298/22 R; 410/91; 414/500
[58] Field of Search ............................ 180/14.1, 14.2; 280/423 R, 423 B, 425 A; 298/22 R; 414/469, 480, 482, 484, 491, 494, 500; 410/77, 80, 84, 90, 91; 220/335, 210, 334

[56] References Cited

U.S. PATENT DOCUMENTS

| | | | |
|---|---|---|---|
| 2,823,818 | 2/1958 | Chastain et al. | 414/494 |
| 2,963,186 | 12/1960 | Beck et al. | 414/494 |
| 3,182,608 | 3/1965 | Mollon | 410/91 |
| 3,467,268 | 9/1969 | Corompt | 414/494 |
| 3,724,695 | 4/1973 | Taylor | 414/494 X |
| 3,812,988 | 5/1974 | Pyle | 414/494 X |
| 3,934,740 | 1/1976 | Rumell | 414/494 X |
| 4,036,396 | 7/1977 | Kennedy et al. | 220/335 X |
| 4,081,094 | 3/1978 | Pereira et al. | 414/484 X |
| 4,096,960 | 6/1978 | Gilmore | 414/482 |
| 4,119,328 | 10/1978 | Rhodes | 280/423 B X |
| 4,133,439 | 1/1979 | Goranson | 414/494 |
| 4,529,349 | 7/1985 | Lutz | 414/421 X |

FOREIGN PATENT DOCUMENTS 2038923  7/1980  United Kingdom .................. 410/91

Primary Examiner—John J. Love
Assistant Examiner—Charles R. Watts
Attorney, Agent, or Firm—John Nevin Shaffer, Jr.

[57] ABSTRACT

A trailer of the container roll-on, roll-off type having a self contained power plant thereby being capable of full operation for loading and unloading regardless of the type of towing vehicle or in the absence thereof. The device is multifarious in uses, in that amoung other capabilities, it may be used as an ordinary flat bed trailer when not in use as a tilting roll-on, roll-off trailer. The device is capable of production in a multitude of sizes making it adaptable to a wide range of needs and uses within the financial means of many who previously have been excluded from ownership of such a vehicle.

4 Claims, 12 Drawing Figures

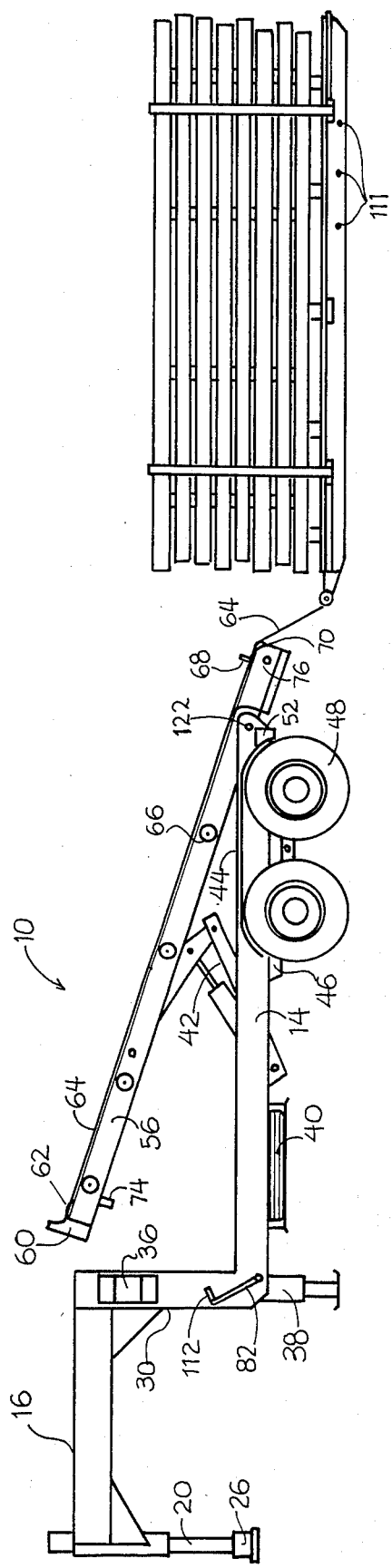
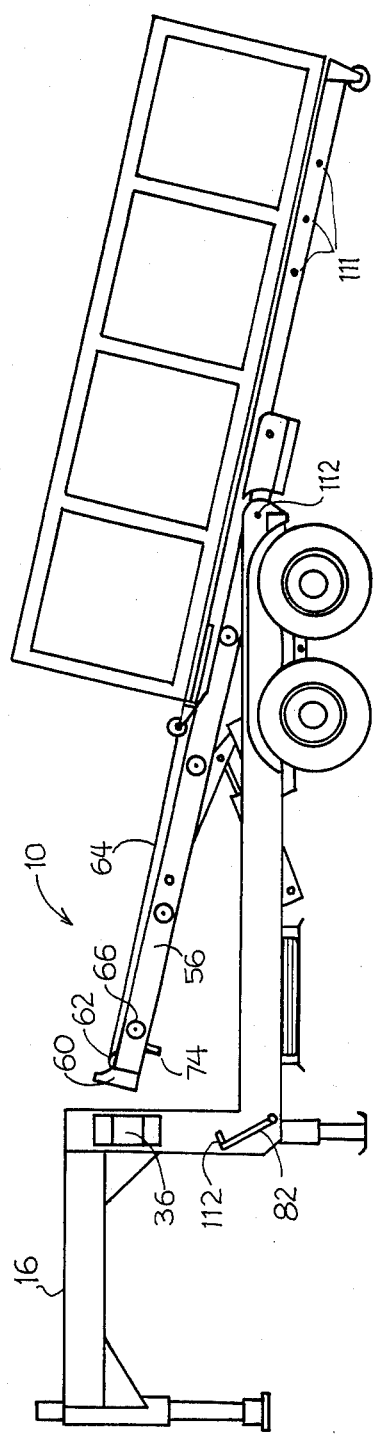

SELF POWERED, ROLL-ON AND ROLL-OFF TRAILER

BACKGROUND OF THE INVENTION

This invention relates to an improved, self powered, roll-on and roll-off trailer apparatus and method for transporting pre-loaded containers, machinery, and other functional equipment capable of being rolled on and off this trailer and which can be built in multi-sizes, some of which can be towed by an ordinary pick-up truck, farm tractor, or other towing vehicle of convenience.

Tilt bed, roll-on, roll-off trailers have been known in the art for quite some time. For example, roll-off hoists with piston and cylinder assemblies for tilting a bed of a truck while hoisting a container onto the bed or while emptying the container as in a normal dump truck have been designed. An example of such a hoist is disclosed in Goranson, U.S. Pat. No. 4,133,439 which utilizes a telescoping hydraulic cylinder to move the hoisting cable and in Lutz, U.S. Pat. No. 4,529,349 which utilizes a pair of hydraulic piston and cylinder assemblies to cause the forward portion of the frame of the device to tilt upward to receive the container or to dump a container as with a standard dump truck.

A drawback to these and other roll-on, roll-off trailers for broad and general use is the fact that they must be powered by specially constructed single purpose vehicles designed to accomplish the tilt bed, roll-on roll-off trailer means. A further drawback is that this necessarily means that the operator of the device is located so far away from the actual operation of the device that he has to rely on rearview mirrors and the like to determine the location and operation of the tilt bed, roll-on, roll-off trailer. A further disadvantage is that previous devices have been unable to accomodate utilization with anything other than a specially designed vehicle. A further disadvantage of previous devices such as this is that they are too expensive to be utilized for a person who has need of such a device on less than a regular basis so that a large percentage of the population which could utilize such a device are forced to utilize some other, less effective, means to meet their recurring needs.

Thus, there is a need in the art for providing a tilt bed, roll-on, roll-off trailer that is self powered. Further, there is a need in the art for providng a tilt bed trailer which, because it is self powered, can be utilized without need of any other vehicle. It is a further object of the invention to provide a self powered, tilt bed trailer that can be towed by trucks, farm tractors, and by ordinary pick-up trucks thereby expanding the availability of such a tilt bed, roll-on, roll-off trailer to many individuals and businesses. It is another object of this invention to provide a trailer which is flexible for use in a variety of common business and individual situations, that is safe in operation, relatively inexpensive to produce and which is not dependent upon a power take off furnished by the towing vehicle itself or any other outside source, thereby being capable of full operation for loading and unloading regardless of the type of towing vehicle or in the absence thereof. Another object of the invention is to provide a tilt bed, roll-on, roll-off trailer which is easily attachable and detachable to a variety of towing vehicles. Another object of this invention is to provide a power supply for power operated equipment which may be carried upon the trailer and operated in place by the power supplied by the trailer. Another object of this invention is to provide a trailer with means whereby a load can be securely locked on board and, at times, in a more balanced or desirable position over the wheels.

SHORT STATEMENT OF THE INVENTION

Accordingly, the self powered, roll-on, roll-off trailer of the present invention includes a neck for attachment to a towing vehicle, a carrying frame mounted on a chassis with wheels for towing by any number of commonly available towing vehicles such as a pick-up truck, a hoisting frame pivoted on the carrying frame, a hydraulic lifting system, a cable winch system, and a self contained power plant. As a result, because this device is equipped with its own power plant, it has no dependency upon a power take-off furnished by the towing vehicle or other outside source, thereby making it capable of full operation for loading and unloading regardless of the type of towing vehicle or the absence thereof. Additionally, the operation of the vehilce is conducted from a safe location at the front and to one side of the tilt bed whereby the operator of the device may safely operate and monitor the operation of the system.

BRIEF DESCRIPTION OF THE DRAWINGS

Other objects, features and advantages of the present invention will become more fully apparent from the following detailed description of the preferred embodiment, the appended claims and the accompanying drawings in which:

FIG. 2 is a side elevation of the invention shown in free standing position with the hoisting frame in the raised position and the winch cable attached to a cargo container, in this case a pre-loaded flat bed;

FIG. 3 is a side view of the invention in the free standing position illustrating a cargo container partially pulled onto, or rolled off of, the hoisting frame;

DETAILED DESCRIPTION OF THE PREFERRED EMBODIMENT

The preferred embodiment of the present invention is illustrated by way of example in FIGS. 1–12.

Figure 1:
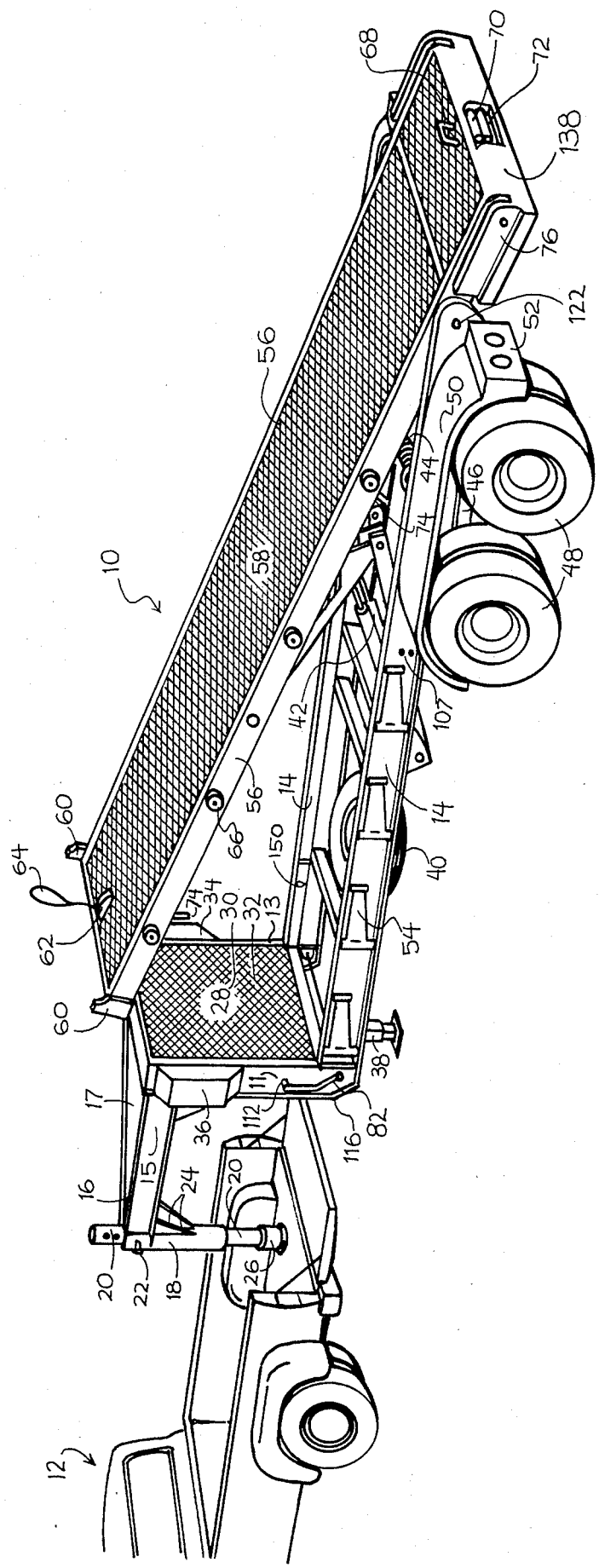
FIG. 1 is a perspective view of a perferred embodiment of the self powered trailer of the present invention with the device in position to be connected to an ordinary pick-up truck and with the hoisting frame of the device in an upward tilted, unloaded position and with a covering in place on the deck of said hoisting frame.

The trailer consists of several main components, all shown in FIG. 1, which are:

1. A coupling arm 18 to which a coupling 26 is attached;
2. A neck 16 in which there is located a power plant area 28, a fuel tank area 34, and controls area 36:
3. A carrying frame 14, which houses the hoisting mechanisms area 42 and winch area 44;
4. A chassis 46, with wheels and undercarriage 48, which supports the carrying frame 14; and
5. A hoisting frame 56 which is mounted on the carrying frame 14 with a common pivoting pin 122 which is located at the rear of both carrying frame 14 and the hoisting frame 56.

With the specific reference to FIG. 1, a towable, self powered, tilt bed trailer 10 is shown ready to be attached to ordinary pick-up truck 12 to be used to tow device 10. Device 10 is comprised of carrying frame 14 to which is attached neck 16. At the forward most end of neck 16 is coupling arm holder 18 into which a coupling arm 20 is inserted and which coupling arm 20 has a plurality of holes drilled perpendicularly there through so that coupling arm pin 22 may be inserted for support and to retain coupling arm 20 at a desired height. Once the desired height for coupling arm 20 is attained and secured by coupling arm pin 22, clamping bolts 24 are secured through coupling arm holder 18 to come securely in contact with coupling arm 20 and thereby positively hold coupling arm 20 in its chosen position. To the base of coupling arm 20 is attached coupling 26 which can be used with standard ball hitches commonly used and known in the art. Other types of hitches and couplings are easily adaptable to this device.

The interior vertical portion of neck 16 contains the power plant area 28 within which is contained a power plant 30 which provides the powering means to operate the device without necessity of obtaining such power from an attendant vehicle or outside apparatus. The power plant 30, not shown, is comprised of a gasoline or diesel powered engine, a battery, a hydraulic oil container, hydraulic pumps, hydraulic flow dividers, hydraulic filters, and all associated connectors and facilities making the combination a functional power unit and all of conventional design readily known in the art. An expanded metal engine cover 32 is provided, at the rear of neck 16, to shield the power plant area 28 and power plant 30 from debris. On opposite sides of neck 16, on the vertical sections 13 and 11 thereof are located fuel tank area 34 and controls area 36 respectively. Both of these areas are more fully described hereafter. Attached to and located underneath neck 16 is rotatable jack 38, shown here in the extended and supporting position and shown more clearly in FIG. 5. Also illustrated in FIG. 1 is spare tire and wheel 40 as well as hoist mechanism area 42 and winch area 44 located within carrying frame 14. Chassis 46 is shown with wheel and under carriage portions 48. Mudguards 50 and rear and brake lights 52 are attached to carrying frame 14. Carrying frame 14 is also provided with a plurality of outriggers 54 designed to widen the bed of the device 10 so that wider loads may be carried when the tilting portion of the device is not needed or desired to be used.

The tilting portion of device 10 consists of hoisting frame 56 shown in FIG. 1 with metal deck cover 58 in place. Hoisting frame 56 has load stops 60 and front sheav 62 at the forward end of hoisting frame 56. Load cable 64 is shown in its retracted position at front sheav 62. A plurality of oppositely positioned load rollers 66 are shown along the outside edges of hoisting frame 56.

Figure 4:
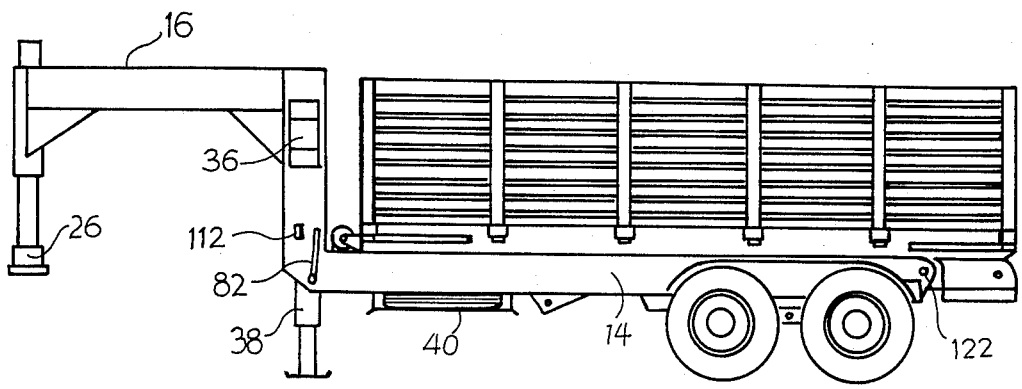
FIG. 4 is a side view of the invention illustrating a cargo container, in this case a flat bed with stake side boards, fully on the hoisting frame which has been lowered and is resting, in traveling position, on the carrying frame.

At the rear of hoisting frame 56 is located an attachably detachable deck cable guide 68, cable rollers 70, recessed license plate area 72, and outside container guides 76 for guiding rails of load containers into position when loading. FIGS. 2 to 4 inclusive illustrate how some of these members functions during various operations of device 10.

Figure 5:
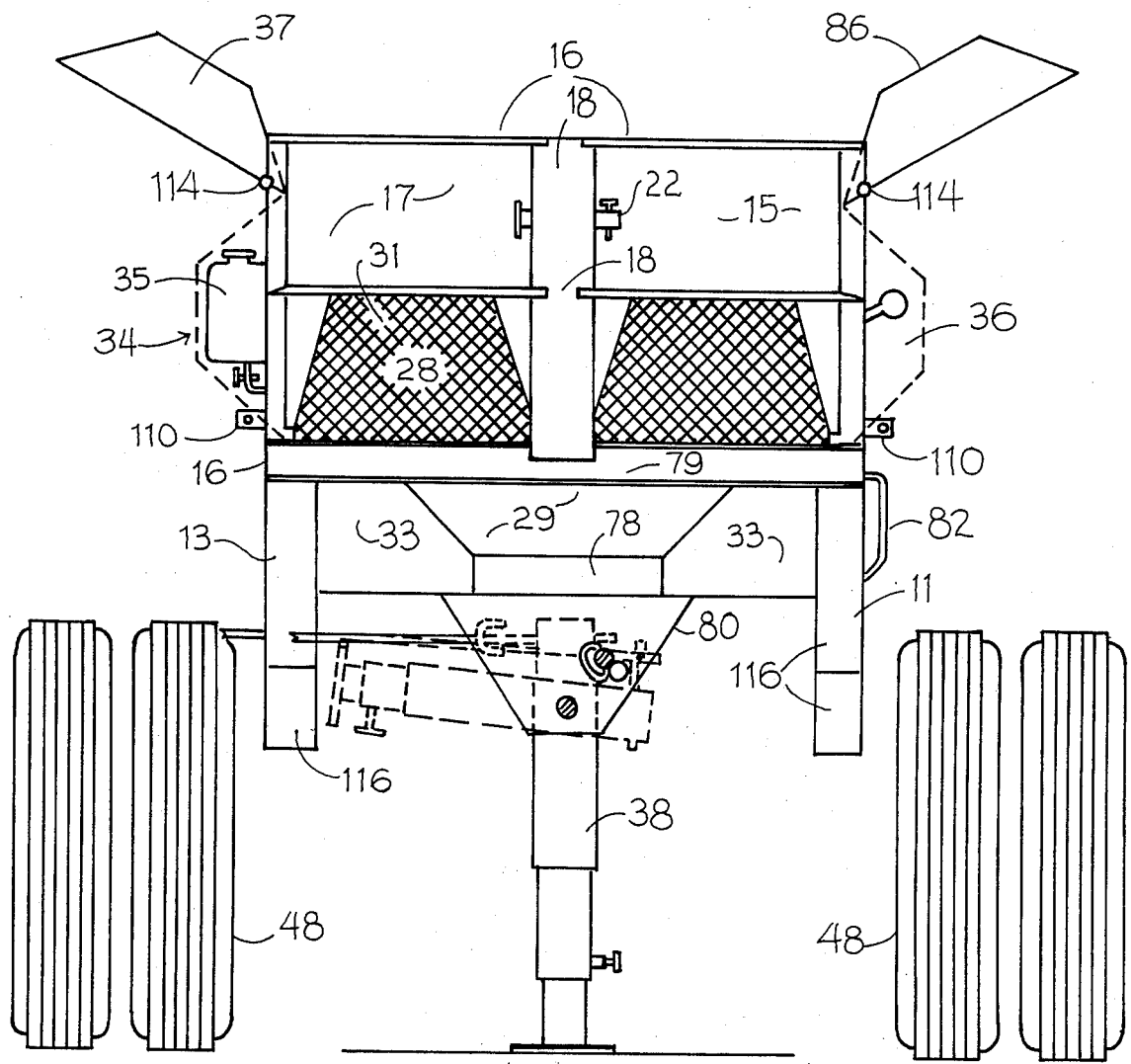
FIG. 5 is a front elevation of the neck of the invention. The coupling arm and coupling are not shown so as to reveal more fully the power plant area location in the neck as well as other features. The tires of the trailer are shown so as to indicate their relative position in regard to other parts of the trailer.

Referring to FIG. 5 there is shown the folding jack 38 in its supporting position with its hanger 80 attached to the lower transverse member 78 of the neck 16 of the device 10. Also shown in dashed lines is the location where this folding jack 38 will rest when folded out of the way for travel. Neck 16 also consists of transverse member 79, to which is attached front power plant cover 31 which allows for ventilation of the power plant area 28. A solid front cover 29 is also shown at the lower portion of the power plant area 28 for protection from flying gravel and other debris when device 10 is being towed. Gusset plates 33 provide support between transverse member 78 and vertical members 11 and 13 of neck 16. Horizontal neck members 15 and 17 converge from the upper part of the vertical members 11 and 13 to meet at the coupling arm holder 18. A fuel tank 35 is located in the fuel tank area 34, on vertical member 13, with a cover 37 equipped for lock and key by lock hanger 110. Fuel is transferred to the power plant 30 by a conventional fuel line not shown. On the opposite side of the neck 16 from the fuel tank cover 37 is a similar cover 66 equipped for lock and key for the controls area 36. the covers so mentioned are held open when necessary by a locking pin 114.

Figure 6:
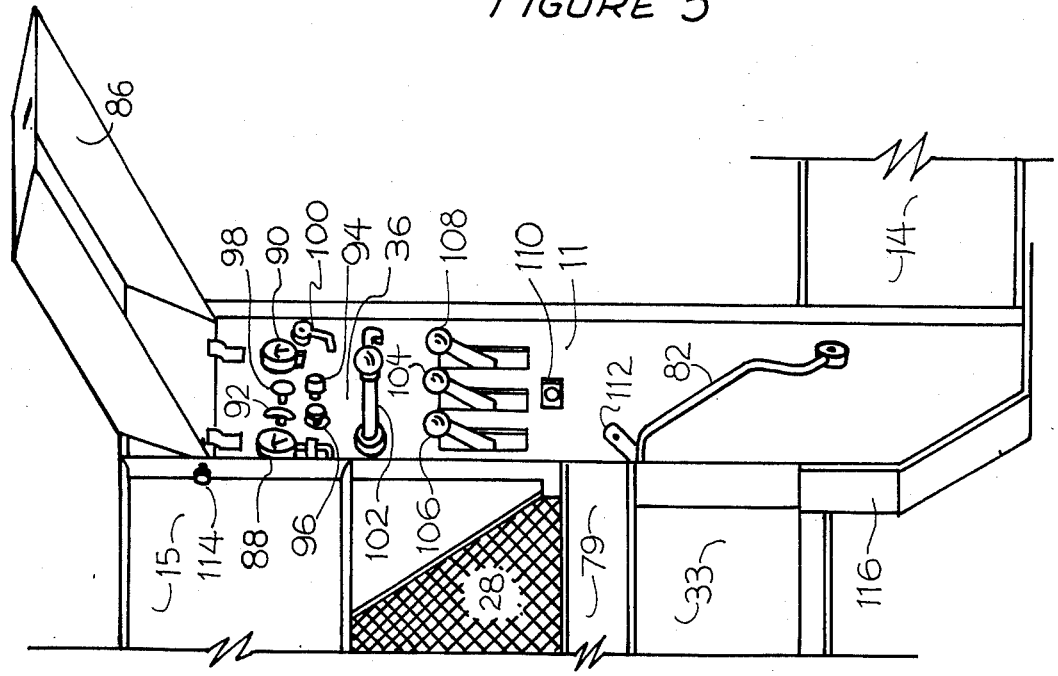
FIG. 6 is a side perspective view of the controls area, with controls which are located on the side of the neck of the invention.

Referring to FIG. 6, vertical member 11 of neck 16 is illustrated showing control area 36 along with control area cover 86. Control area 36 is shown to include hydraulic oil pressure gauge 88, ampere meter 90, throttle 92, starter button 94, ignition switch 96, choke control 98, winch clutch control lever catch 100, winch clutch control lever 102, hoisting frame hydraulic control lever 104, auxiliary hydraulic control lever 106, winch control lever 108 and control area cover lock hanger 110. Also illustrated are load lock control lever catch 112, load lock control lever 82 and cover holding pin 114. There is also shown flange plate 116 connecting neck 16 to carrying frame 14.

Figure 7:
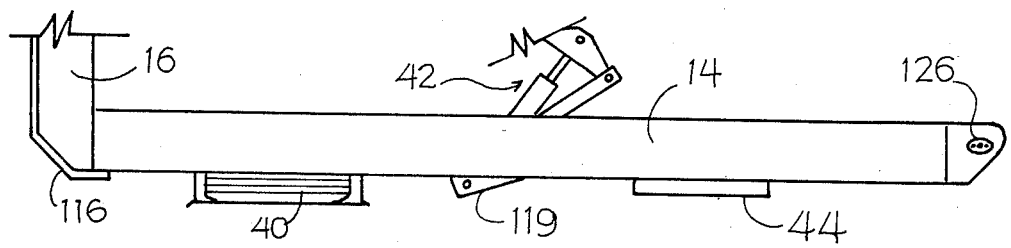
FIG. 7 is a side view of the carrying frame.
Figure 8:
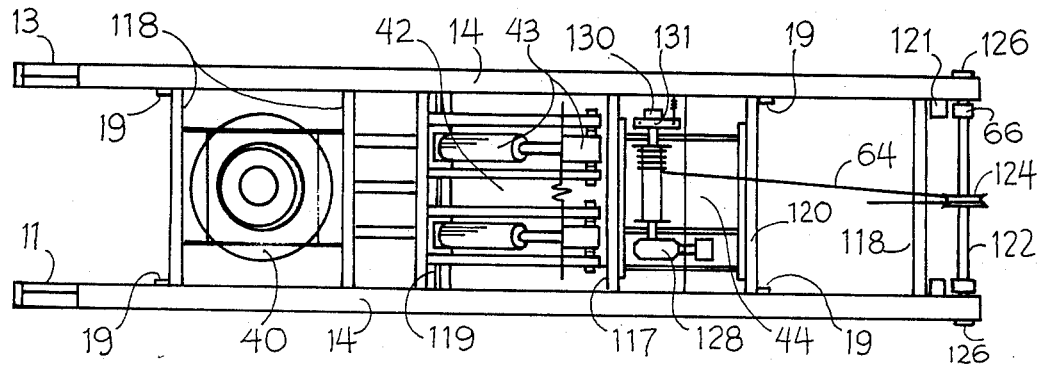
FIG. 8 is a top view of the carrying frame which indicates the location of the hoisting mechanical area, the winch area, the spare wheel area, and the pivoting area where the hoisting frame is anchored.

Referring now to FIGS. 7 and 8, spare tire and wheel 40 are shown anchored to transverse members 118. The hoisting mechanism area 42 is shown in the central portion where the hoisting mechanism 43 is anchored to transverse member 119 and where the hoisting mechanism 43 is resting on transverse member 117 when the mechanism is in a lowered position. The winch area 44 is located in the area in back of and adjoining the hoisting mechanism area 42. Winch 128 is shown to be anchored to transverse members 117 and 120. Winch clutch 130 and the winch clutch arm 131 are shown. The pivoting pin 122, which rotatably secures the hoisting frame 56, is located at the rear of carrying frame 14 and also rotatably secures the rear load cable sheav 124 and load rollers 66. Also shown at the rear of carrying frame 14 are spacers 121 which keep the hoisting frame in place on the pivoting pin 122, a transverse member 118, load cable 64, and removable cover plates 126 at the ends of pivoting pin 122.

Figure 9:
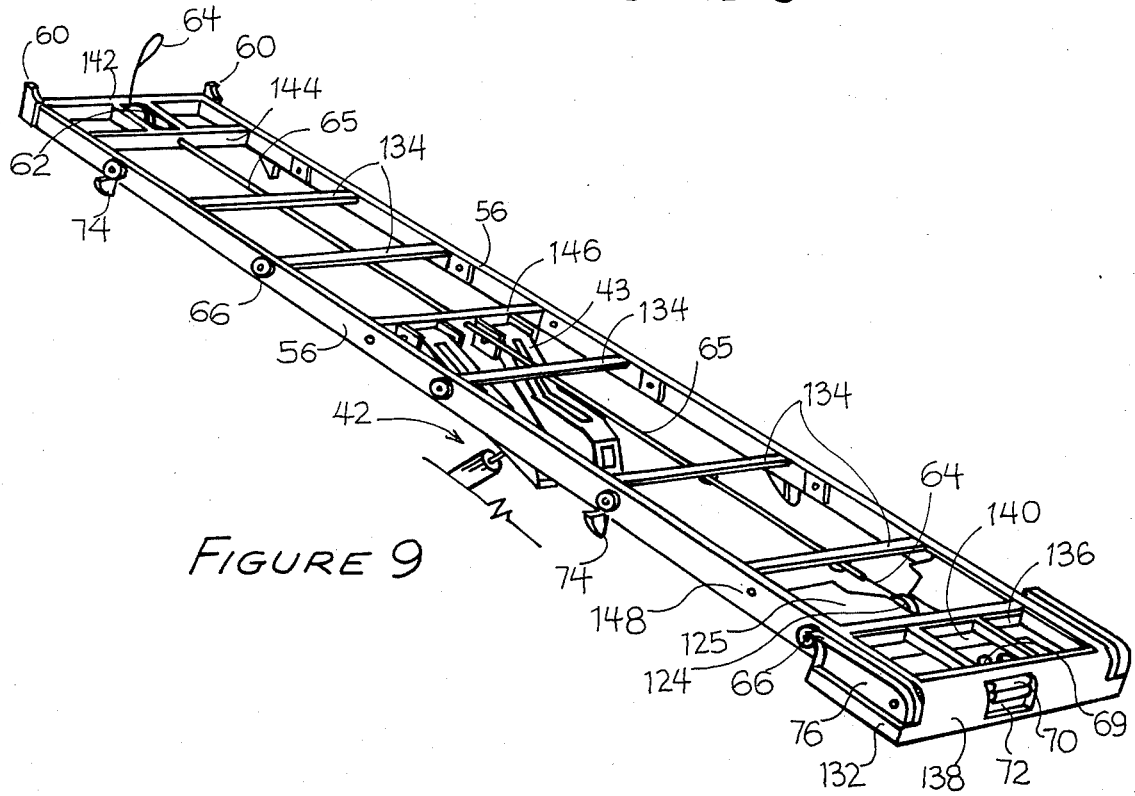
FIG. 9 is a perspective view of the hoisting frame with the deck cover removed.

Referring now to FIG. 9 all main members and parts of the hoisting frame 56 are shown. Load stops 60 are shown at the forward end of said hoisting frame 56, as well as the front load cable sheave 62 which is anchored to the front transverse member 142 and the second transverse cross member 144. The load cable 64 is shown where it transverses the length of the hoisting frame 56 from front load cable sheav 62 to rear load cable sheav 124 through the load cable conduit 65. Along each side of the hoisting frame 56 are load rollers 66 spaced so as to allow the rails of load containers to easily be rolled on or off the trailer. Hoisting frame guides 74 are located, as shown, so as to guide the hoisting frame 56 to its proper resting place when it is lowered upon the carrying frame 14. Hoisting frame rail guide bumpers 19 (see FIG. 8) are securely attached to carrying frame 14 and effectively extend the insides of the carrying frame 14 at the precise location where the hoisting frame guides 74 meet the carrying frame 14. As a result, the outer edges of hoisting frame guides 74 come fully into contact with the bumpers 19 when the hoisting frame 56 is fully lowered and side to side motion of the hoisting frame 56 is prevented. Various deck support transverse cross members 134 are shown to which the deck cover 58 (not shown in this figure) is attached. The hoisting mechanism 43 is attached to hoisting frame 56 at the third transverse cross member 146. The pivoting pin 122 transverses (passes through) the outside supports of the carrying frame 14, the outside supports of the hoisting frame 56 and the inside supports on the rear sheav gusset plates 125 which are attached to the fourth transverse member 136. The rear portion of the hoisting frame 56 is shown to be widened where this frame extends rearward from the carrying frame 14. This widening is accomplished by attachment of transverse widening members 138 and 140 to the rear of the main longitudinal hoisting frame 56. These transverse widening members are connected to longitudinal widening members 132 upon which are anchored load guides 76.

Figure 10:
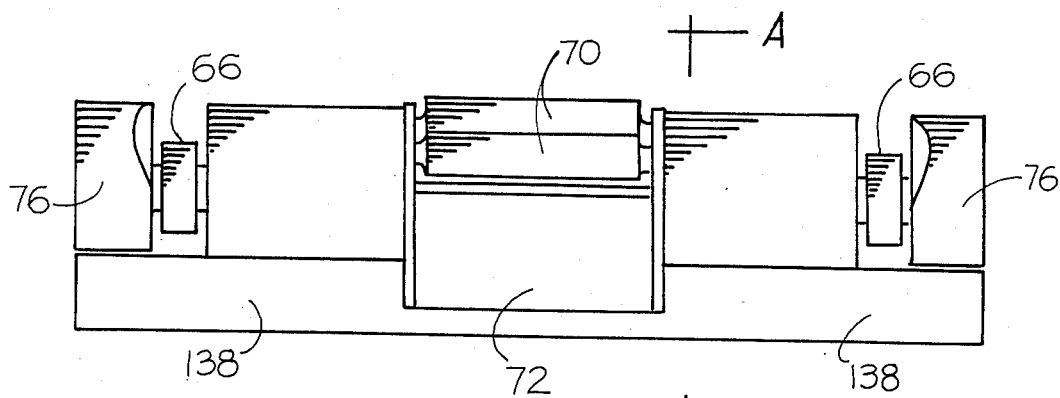
FIG. 10 is a rear view of the hoisting frame showing visable parts only.
Figure 11:
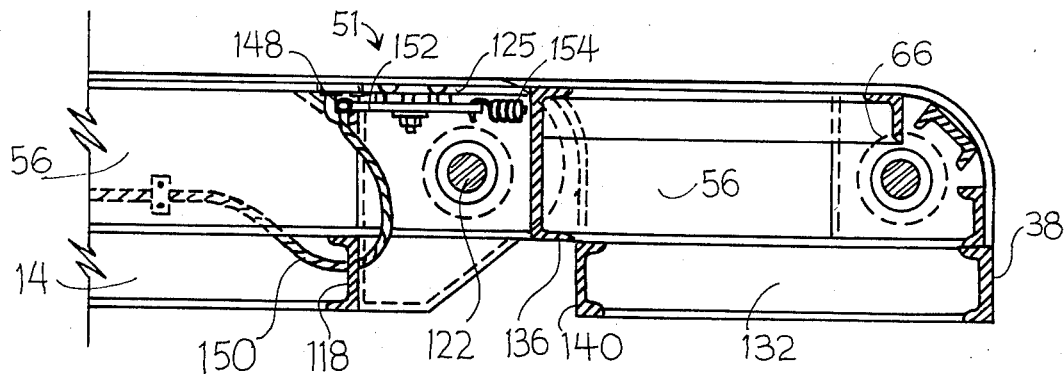
FIG. 11 is a sectional view of FIG. 10 taken along line A—A showing the load lock area, the pivoting pin area and the rear load roller area.
Figure 12:
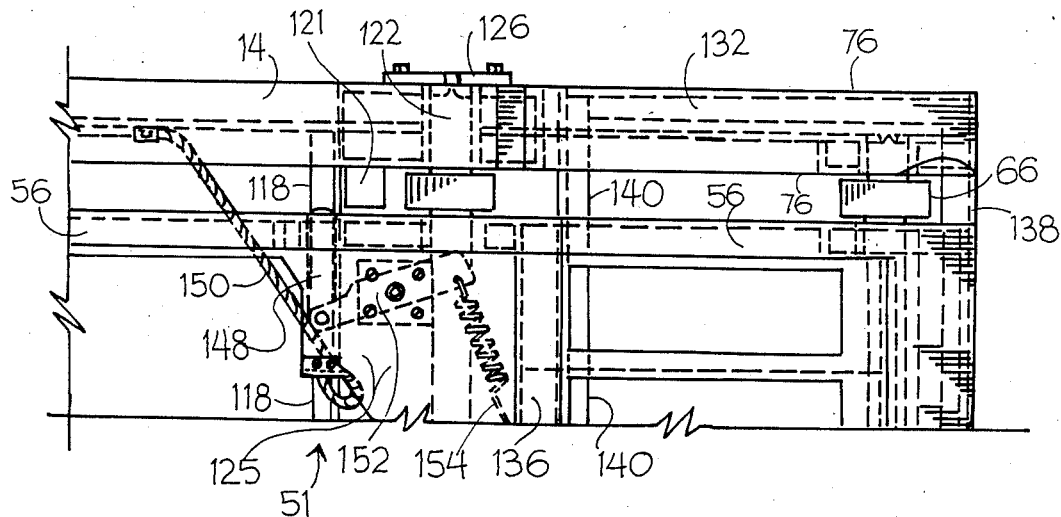
FIG. 12 is a plan view of FIG. 11 with the deck cover removed showing the load lock area, the pivoting pin area and the rear load roller area.

Referring now to FIGS. 10, 11 and 12, the rear of hoisting frame 56 is shown in detail. The state registration license plate area 72 is shown and the load cable rollers 70 are centrally located and anchored to horizontal widening member 138. Additionally, locking mechanism 51, operated by load lock handle 82, is shown in FIGS. 11 and 12 wherein this locking mechanism 51 is suspended on rear sheav gusset plate 125. Load lock pin 148 is disclosed along with load lock control cable 150, load lock swivel 152 and load spring tension means 154.

In operation the towable, self powered, tilt bed, roll-on, roll-off trailer device 10 consists of several main components which are a coupling arm 20 to which a coupling mechanism 26 is attached to enable the device 10 to be towed by any common vehicle, such as a pickup truck 12. A neck 16 is provided which is composed of two vertical members 11 and 13 attached to the forward end of carrying frame 14 which provide the space for power plant area 28 there between and the location for fuel tank area 34 and controls area 36. Vertical members 11 and 13 of neck 16 are joined to carrying frame 14 by means of flange plate 116. At the top of vertical members 11 to 13 two oppositely positioned horizontal members 15 and 17 are attached which then are brought together at a point and attached to coupling arm holder 18. Coupling arm holder 18 is a downward facing pipe, hollow on the inside, with a hole drilled through it at the point the two oppositely positioned horizontal members 15 and 17 join the coupling arm holder 18. Coupling arm 20 is a pipe with a circumference just less than the coupling arm holder 18. Coupling arm 20 is provided with a plurality of holes along its length so that a variety of different coupling lengths may be chosen by aligning the hole in coupling arm holder 18 with one of the holes in coupling arm 20 and inserting coupling arm pin 22 to secure the chosen position. Clamping bolts 24 are provided which pass through openings in coupling arm holder 18 and come in contact with coupling arm 20 so as to secure coupling arm 20 in a stationary position once a desired height has been chosen. A coupling 26 is attached to the bottom of coupling arm 20 and can be of any number of conventional coupling designs known in the art so that the standard trailer ball and hitch may be utilized in order to secure device 10 to the towing vehicle 12.

The power supply and controls to operate device 10 for loading and unloading are located in neck 16. A power plant unit 30 is located in power plant area 28 between two vertical members 11 and 13 and consists of a combination of conventional, readily available items known in the art including a properly sized engine, gas or diesel, battery, hydraulic oil container, hydraulic pump, hydraulic flow divider, filters, and associated framework as previously disclosed. On the outside of one of the two vertical members 11 and 13 is fuel tank area 34 (FIG. 5 shows it on vertical member 13) consisting of fuel tank 35 and fuel tank area cover 37 which is designed to be securable by lock and key as shown in FIGS. 5 and 6. Fuel is transferred to the power plant unit 30 by a conventional fuel line not shown. On the opposite side of the neck 16 from fuel tank area 34 is controls area cover 86 also equipped for lock and key by utilization of lock hanger 110 as illustrated in FIG. 6. Controls area 36 contains hydraulic oil pressure gauge 88, throttle control 92, choke control 98, ignition switch 96, ampere meter 90, starter button 94, which clutch control lever 108, hoisting hydraulic control lever 104, winch clutch control lever 102 and auxiliary hydraulic power levers 106. Also in the controls area 36, but below and outside the covered area, is the lock control handle 82 for releasing and engaging load locks 148 as shown in FIGS. 11 and 12.

As previously stated, the neck 16 of this device 10 is attached to carrying frame 14 by welding, or some other suitable means known in the art, the vertical members 11 and 13 to carrying frame 14. A transverse cross member 78 forms the bottom of power plant area 28 and connects the two upright vertical members 11 and 13. A jack 38 is attached to cross member 78 by use of a hanger 80 as illustrated in FIG. 5. Hanger 80 is designed to allow jack 38 to fold into a position whereby all parts of the jack 38 are well above the ground or roadway surface during traveling periods. FIG. 5 shows the jack 38 in a folded position, in dotted lines, and in its extended/loaded position.

To operate this device 10 it is necessary to expose the controls located in controls area 36 by opening control area cover 86 as shown in FIG. 6. Both the controls cover 86 and fuel tank cover 37 are held open by cover holding pin 114, as illustrated in FIG. 6, and both the covers are locked closed by placing a lock in lock hanger 110 when the covers are closed. When controls area cover 86 is open, the previously described switches and levers may be operated in the manner described. For instance, when trailer device 10 is empty and it is desired to load a cargo onto the hoisting frame 56, the power plant 30 is activated by the previously described controls and winch hydraulic control lever 108 is moved upward to disengage winch clutch 130, illustrated in FIG. 8. This winch clutch 130 is held open by the clutch lever catch 100 (FIG. 6) which is automatically engaged when winch clutch control lever 102 is raised. The operator can then pull load cable 64 to the container carrying the load where cable 64 can be secured to the subject container in a normal fashion. On returning to controls area 36, the operator then releases the clutch lever catch 100 whereby the clutch lever 102 then automatically lowers and the winch clutch 130 is engaged, by spring action, allowing the operator to initiate loading the cargo vessel onto hoisting frame 56 by operating the proper winch hydraulic control lever 108 for this purpose. Device 10 is provided with auxiliary power connections 107, as shown in FIG. 1. These auxiliary power connections provide the ability users of the device 10 to attach other tools to these connections 107 and, because device 10 is self powered, the user can operate these additional tools, by operation of auxiliary hydraulic control lever 106, without need of additional power sources.

Before loading, the operator moves load lock control lever 82 in the direction of the front of trailer device 10 until it engages load lock control lever catch 112 which holds load lock control handle 82 in place. In this position load lock control handle 82 disengages load locks 148 as shown in FIGS. 11 and 12 and holds them open until the operator desires to lock the load in place by disengaging load lock control lever catch 112 from the load lock control handle 82 after which the load locks 148 automatically, by spring action 154, go into locking position by being thrust into prepared openings 111 in the cargo vessel rails. These prepared openings 111 on certain cargo vessel load rails are illustrated in FIGS. 2 and 3. Load lock pins 148 are engaged, in the locked position, when load lock control handle 82 is in a released position as shown in FIG. 4. Load lock pins 148 are in an unlocked position when load lock control handle 82 is engaged by load lock control lever catch 112 as shown in FIGS. 1, 2, 3 and 6.

The carrying frame 14 of trailer device 10 is the main structural body of this trailer device 10 to which all other main components, such as the neck 16, the chassis 46 and the hoisting frame 56 are attached. The carrying frame 14 houses a spare tire and wheel 40, the hoisting mechanism area 42 and the cable winch area 44. Outriggers 54 may be attached to the outside of carrying frame 14, when desired, to extend carrying frame 14 thereby enabling it to receive floorboards to widen the bed of trailer 10 for carrying loads such as those carried by any other flat bed trailer. Also attached to the rear of carrying frame 14 are mudguards 50 and brake and traveling lights 52. Hydraulic lines from controls area 36 are run along the protected inside of carrying frame 14 to the hoisting mechanism area 42, the winch area 44 and to a plurality of auxiliary hydraulic power connections 107 which can be conveniently located along the trailer device 10 at many places. Also conveyed along the inside, protected area, of the carrying frame 14 are the cables for controlling the winch clutch 130, for the load locks 148 (shown as load lock control cable 150 in FIGS. 11 and 12) and for necessary electrical conduits for trailer lighting (not shown).

The carrying frame 14 consists of two oppositely positioned horizontal beams connected by transverse members 118. Transverse member 119 provides a location to attach the hoisting mechanisms 43 and to provide a resting support for the hoisting frame 56 when it is lowered to its horizontal position. The transverse members 118 also provide an area to mount the loading winch 128 in winch area 44. Hoisting frame 56 comes to rest on cross members 118 when hoisting frame 56 is lowered into place on the carrying frame 14. Rail guides 74 are provided to guide hoisting frame 56 into its resting place on carrying frame 14 when it is lowered. Spacers 121 are provided near the rear of carrying frame 14 to keep hoisting frame 56 in a fixed transverse position on the pivoting pin 122 while the hoisting frame 56 is being raised or lowered. As load cable 64 is wound upon or unwound from winch 128, it travels around a rear sheav 124 which turns on the pivoting pin 122 from where load cable 64 passes forward on the underside of hoisting frame 56 and around front sheav 62 where the end of the cable 64 is shown in FIG. 1. As shown in FIGS. 10, 11 and 12, pivoting pin 122 also contains a pair of oppositely positioned load rollers 66. Surrounding pivoting pin 122 are bushings, not shown. Covering carrying frame 14 at each end of pivoting pin 122 is an access plate 126, shown in FIG. 7, 8 and 12 which must be removed for pivoting pin 122 removal and lubrication.

A chassis 46 consists of a simple frame for receiving carrying frame 14 and the wheel and undercarriage mechanisms 48 which are of ordinary construction known in the art.

Hoisting frame 56 is rotatable upon pivoting pin 122, which is common to carrying frame 14, as well. Hoisting frame 56 is elevated or lowered by the hoisting mechanism 43 located in hoist mechanism area 42 on carrying frame 14. This hoisting mechanism 43 consists of any appropriate type of lifting device activated by hydraulic power. The commonly known sissors type of lifting device is illustrated in the figures attached hereto and no fruther discussion of the hydraulic powered hoisting mechanism is necessary as this means is welll known in the art and commonly available. Hoisting frame 56 is comprised of a paair of oppositely positioned parallel outside rails connected by a plurality of hoisting frame transverse members. Front transverse member 142 connects the forward end of hoisting frame 56 and provides support for front cable sheav 62 and an area for rail guides 74 are attached to frame 56, for guiding hoisting frame 56 into proper location when it is lowered upon carrying frame 14. The second transverse member 144 provides support for the rear attachment of front cable sheav 62, the third transverse member 146 provides an attachment for hoisting mechanism 43 in hoisting mechanism area 42, the fourth transverse member 136 provides support for attachment of the rear cable sheav 124 and the fifth transverse member 138 joins the rear of hoisting frame 56 and provides the location for a protected license plate area 72.

Rearward from the common pivoting pin 122 of carrying frame 14 and hoisting frame 56, hoisting frame 56 may be widened to the width of carrying frame 14, or larger, by the attachment of widening transverse member 140 joined together by longitudinal widening members 132 to which are bolted outside container 76. Outside container guides 76 provide the outside support for the most rearward load rollers 66. The rear portion of the hoisting rails of hoisting frame 56 are supported and reinforced longitudinally by longitudinal rail support members 134.

The fifth transverse member 138 also provides support for removable deck cable guide 68 and support for load cable rollers 70. Deck cable guide 68 and load cable rollers 70 permit load cable 64 to pull the load directly to the center of the rear of trailer device 10 so that load runners on the cargo container may be properly located for rolling the load onto hoisting frame 56. After the subject load is properly aligned, deck cable guide 68 is removed and stored until needed again. Unless the load is very much off center of the trailer device 10, after stopping to load, the deck cable guide 68 will not be needed for guiding load cable 64 when loading and, in fact, cable guide 68 must be removed before a container is pulled onto the trailer 10.

While the trailer device of the present invention has been disclosed in connection with use with an ordinary pick-up truck, it should be appreciated that this safe, portable, self powered system can be used with a wide variety of ordinary vehicles now in widespread use. The present invention provides an improved trailer which can be easily manipulated by a use located in a safe and clear viewing area without need of any additional power system other than provided in the device itself. The control and fuel areas and power system are simple, reliable and safely separated. Thus the trailer mechanism of the present invention has important advantages of portability, safety and ease of use.

While the present invention has been disclosed in connection with the preferred embodiment thereof, it should be understood that there may be other embodiments which fall within the spirit and scope of the invention as defined by the following claims.

What is claimed is:

1. A self powered, roll-on, roll-off trailer device comprising:
    (a) a chassis and undercarriage frame equipped with a wheel assembly for movement of said device;
    (b) a carrying frame attached to said chassis comprised of longitudinal beams laterally supported by transverse beams forming rectangular shapes so as to provide housing areas for a spare tire and wheel, a hydraulic hoisting mechanism and a cable winch;
    (c) a receptacle in said carrying frame for receiving a pivoting pin whereby a hoisting frame and said carrying frame are pivotally joined at only one end;
    (d) said hoisting frame comprised of longitudinal beams laterally supported by transverse beams, forward of said pivoting pin, narrower than said carrying frame so that when said hoisting frame is lowered to its lowest, horizontal, position said hoisting frame rests within said carrying frame and so that a top horizontal plane of said hoisting frame is level with a top horizontal plane of said carrying frame and also so the cargo containers loaded thereon rest only on said hoisting frame;
    (e) a rear portion of said hoisting frame, located to the rear of said pivoting pin, that is wider than said carrying frame, which is provided with a plurality of oppositely positioned load rollers which contact rails of cargo containers and enable said cargo containers to roll on and off smoothly and wherein a clear channel is provided in the top of said hoisting frame to allow said cargo containers to be guided forward on said load rollers;
    (f) a pair of oppositely positioned outside container guides located in said rear portion of said hoisting frame that further define said clear channel and which ensure the proper loction of said cargo container on said hoisting frame;
    (g) a motorized winch securely attached to said carrying frame in the rear one-half of said carrying frame;
    (h) a cable with one end securely attached to said winch and the other end of said cable which passes rearwardly from said winch to a rear sheav, located on said pivoting pin for said carrying and said hoisting frames, then forward from said rear sheav within a cable shielding conduit secured underneath and parallel to said hoisting frame to a forward sheav secured to the forward end of said hoisting frame where said cable passes around said forward sheav to the outside and on top of said hoisting frame with the free end of said cable ready for use;
    (i) a cable guide means comprised of a cable roller located in the middle of said wide rear portion of said hoisting frame and a narrow, removably attachable "U"-shaped guide that, when placed over said cable, guides said cable over said cable roller thereby aligning said container to be loaded with said hoisting frame;
    (j) two vertical beams attached to and extending upwardly from the top of said carrying frame which provide a protected space to accommodate a power unit between said vertical beams;
    (k) a control panel, with a lockable protective cover, located on a side of one of said vertical beams whereby said power unit and all operations of said trailer may be safely conducted by one user at one safe location;
    (l) a fuel tank, with a lockable protective cover, located on a side of one of said vertical beams opposite from said control panel so that fuel for said power unit is safely isolated;
    (m) a triangularly shaped forward, horizontally, extending portion extending from the tops of said vertical beams and meeting at a coupling arm holder, with a plurality of clamping bolts;
    (n) a downwardly extending, variable height adjusting, coupling arm for conencting said trailer to a chosen towing vehicle wherein said coupling arm is held securely in place in said coupling arm holder by said clamping bolts;
    (o) a load locking means comprised of a pair of oppositely positioned retractable shafts attached to said hoisting frame;
    (p) a locking cable attached to said retractable shafts, which are spring loaded to force said shafts outward in the direction of the longitudinal sides of said hoisting frame;
    (q) a single handle, attached to said locking cable, with a releasable handle locking catch so that when said handle locking catch is released said handle is free to move thereby enabling said spring loaded shafts to plung plunge outward in the direction of the longitudinal sides of said hoisting frame and extend a portion of said shafts into a predetermined portion of a cargo container rail, thereby locking said cargo container to said hoisting frame until said shafts are retracted by reverse operation of said handle; and (r) a means to cover and lock said controls and fuel areas comprised of metal covers mounted upon said respective vertical beams of said neck so that said metal covers are provided with hinges at the top so that said covers are attached to and swing upward from said vertical beams, and said covers are held, when desired, in an upright position by a pin inserted into the side of said cover and into said vertical beam, and so that when said cover is lowered it covers said control and fuel areas and lays over a protruding lock receptacle such that when a lock is inserted in said receptacle said cover cannot be raised, thus placing said controls and fuel areas under locked protective cover.

2. A self powered, roll-on, roll-off trailer device comprising:

(a) a chassis and undercarriage frame equipped with a wheel assembly for movement of said device;

(b) a carrying frame attached to said chassis comprised of longitudinal beams laterally supported by transverse beams forming rectangular shapes so as to provide housing areas for a spare tire and wheel, a hydraulic hoisting mechanism and a cable winch;

(c) a receptacle in said carrying frame for receiving a pivoting pin whereby a hoisting frame and said carrying frame are pivotally joined at only one end;

(d) said hoisting frame comprised of longitudinal beams laterally supported by transverse beams, forward of said pivoting pin, narrower than said carrying frame so that when said hoisting frame is lowered to its lowest, horizontal, position said hoisting frame rests within and extends beyond said carrying frame and so that a top horizontal plane of said hoisting frame is level with a top horizontal plane of said carrying frame and also so that cargo containers loaded thereon rest only on said hoisting frame;

(e) a rear portion of said hoisting frame, located to the rear of said pivoting pin, that is wider than said carrying frame, which is provided with a plurality of oppositely positioned load rollers which contact rails of cargo containers and enable said cargo containers to roll on and off smoothly and wherein a clear channel is provided in the top of said hoisting frame to allow said cargo containers to be guided forward on said load rollers;

(f) a pair of oppositely positioned outside container guides located in said rear portion of said hoisting frame that further define said clear channel and which ensure the proper location of said cargo container on said hoisting frame;

(g) a motorized winch securely attached to said carrying frame in the rear one-half of said carrying frame;

(h) a cable with one end securely attached to said winch and the other end of said cable which passes rearwardly from said winch to a rear sheav, located on said pivoting pin for said carrying and said hoisting frames, then forward from said rear sheav within a cable shielding conduit secured underneath and parallel to said hoisting frame to a forward sheav secured to the forward end of said hoisting frame where said cable passes around said forward sheav to the outside and on top of said hoisting frame with the free end of said cable ready for use;

(i) a cable guide means comprised of a cable roller located in the middle of said wide rear portion of said hoisting frame and a narrow, removably attachable "U"-shaped guide that, when placed over said cable, guides said cable over said cable roller thereby aligning said container to be loaded with said hoisting frame;

(j) two vertical beams attached to and extending upwardly from the top of said carrying frame which provide a protected space to accommodate a power unit between said vertical beams;

(k) a control panel, with a lockable protective cover, located on a side of one of said vertical beams whereby said power unit and all operations of said trailer may be safely conducted by one user at one safe location;

(l) a fuel tank, with a lockable protective cover, located on a side of one of said vertical beam opposite from said control panel so that fuel for said power unit is safely isolated;

(m) a triangularly shaped forward, horizontally, extending portion extending from the tops of said vertical beams and meeting at a coupling arm holder, with a plurality of clamping bolts;

(n) a downwardly extending, variable height adjusting, coupling arm for connecting said trailer to a chosen towing vehicle wherein said coupling arm is helf securely in place in said coupling arm holder by said clamping bolts;

(o) a load locking means comprised of a pair of oppositely positioned retractable shafts attached to said hoisting frame;

(p) a locking cable attached to said retractable shafts, which are spring loaded to force said shafts outward in the direction of the longitudinal sides of said hoisting frame; and (q) a single handle, attached to said locking cable, with a releasable handle locking catch so that when said handle locking catch is released said handle is free to move thereby enabling said spring loaded shafts to plung outward in the direction of the longitudinal sides of said hoisting frame and extend a portion of said shafts into a predetermined portion of a cargo container rail, thereby locking said cargo container to said hoisting frame until said shafts are retracted by reverse operation of said handle.

3. The trailer of claim 1 or 2 wherein a pivotable jack is attached to a forward cross member of said carrying frame and centered directly between and below said two vertical beams attached to said carrying frame so that said pivotable attachment allows said jack to rotate upward and away from the ground at least 90 degrees and to be secured in that position for traveling and, when the device is desired to be supported when said towing vehicle is removed, said jack can be rotated away from said frame toward said ground, said jack extended and utilized and held in said extended position so as to support said frame without said towing vehicle.

4. A method of providing a self powered, roll-on, roll-off trailer comprising the steps of:

(a) constructing a chassis and undercarriage frame equipped with a wheel assembly for movement of said device;

(b) attaching to said chassis a carrying frame comprised of longitudinal beams laterally supported by transverse beams forming rectangular shapes so as to provide housing areas for a spare tire and wheel, a hydraulic hoisting mechanism and a cable winch;

(c) providing a receptacle in said carrying frame for receiving a pivoting pin whereby a hoisting frame and said carrying frame are pivotally joined at only one end;

(d) constructing said hoisting frame of longitudinal beams laterally supported by transverse beams, forward of said pivoting pin, narrower than said carrying frame so that when said hoisting frame is lowered to its lowest, horizontal, position said hoisting frame rests within and extends beyond said carrying frame and so that a top horizontal plane of said hoisting frame is level with a top horizontal plane of said carrying frame and also so that cargo containers loaded thereon rest only on said hoisting frame;

(e) constructing a rear portion of said hoisting frame that extends beyond said carrying frame, located to the rear of said pivoting pin, that is wider than said carrying frame, which is provided with a plurality of oppositely positioned load rollers which contact rails of cargo containers and enable said cargo containers to roll on and off smoothly and wherein said rear portion forms a clear channel in the top of said hoisting frame to allow said cargo containers to be guided forward on said load rollers;

(f) attaching a pair of oppositely positioned outside container guides located in said rear portion of said hoisting frame that further define said clear channel and which ensure the proper location of said cargo container on said hoisting frame;

(g) securely attaching a motorized winch to said carrying frame in the rear one-half of said carrying frame;

(h) securely attaching one end of the cable to said winch and the other end of said cable, which passes rearwardly from said winch to a rear sheav, located on said pivoting pin for said carrying and said hoisting frames, then forward from said rear sheav within a cable shielding conduit secured underneath and parallel to said hoisting frame to a forward sheav secured to the forward end of said hoisting frame where said cable passes around said forward sheav to the outside and on top of said hoisting frame, so that the free end of said cable is ready for use;

(i) attaching a cable guide means in the middle of said wide rear portion of said hoisting frame and providing a removably attachable "U"-shaped guide that, when placed over said cable, guides said cable over said cable roller thereby aligning said container to be loaded with said hoisting frame;

(j) attaching two vertical beams to the top of said carrying frame which extend upwardly from said top of said carrying frame and which provide a protected space to accommodate a power unit between said vertical beams;

(k) locating a control panel, with a lockable protective cover, on a side of one of said vertical beams, whereby said power unit and all operations of said trailer may be safely conducted by one user at a safe location;

(l) locating a fuel tank, with a lockable protective cover, on a side of one of said vertical beams opposite from said control panel, so that fuel for said power unit is safely isolated;

(m) attaching a triangularly shaped forward, horizontally, extending portion from the tops of said vertical beams so that said portion meets at a coupling arm holder, with a plurality of clamping bolts;

(n) attaching, by use of said clamping bolts, a downwardly extending, variable height adjusting, coupling arm for connecting said trailer to a chosen towing vehicle;

(o) attaching of oppositely positioned retractable shafts to said hoisting frames to provide a rail locking means;

(p) attaching a locking cable to said retractable shafts, which are spring loaded to force said shafts outward in the direction of the longitudinal sides of said hoisting frame;

(q) attaching a single handle to said locking cable, with a releasable handle locking catch so that when said handle locking catch is released said handle is free to move thereby enabling said spring loaded shafts to plung outward in the direction of the longitudinal sides of said hoisting frame and extend a portion of said shafts into a predetermined portion of a cargo container rail, thereby locking said cargo container to said hoisting frame until said shafts are retracted by reverse operation of said handle; and (r) mounting a means to cover and lock said controls and fuel areas upon said vertical beams of said neck so that said means are provided with hinges at the top so that said means are attached to and swing upward from said vertical beams, and said covers are held, when desired, in a upright position by a pin inserted into the side of said means and into said vertical beam, and so that when said means is lowered it covers said control and fuel areas and lays over a protruding lock receptacle such that when a lock is inserted in said receptacle said cover cannot be raised, thus placing said controls and fuel areas under locked protective cover.

* * * * *

UNITED STATES PATENT AND TRADEMARK OFFICE
CERTIFICATE OF CORRECTION

PATENT NO. : 4,704,062
DATED : November 3, 1987
INVENTOR(S) : Isom H. Hale

It is certified that error appears in the above-identified patent and that said Letters Patent is hereby corrected as shown below:

On the title page the filing date should read

-- March 6, 1986 --.

Signed and Sealed this

Sixth Day of December, 1988

Attest:

DONALD J. QUIGG

*Attesting Officer*  *Commissioner of Patents and Trademarks*